United States Patent
Terao (10) Patent No.: US 8,347,102 B2
(45) Date of Patent: Jan. 1, 2013

(54) IMAGE PROCESSING APPARATUS AND METHOD FOR TRANSMITTING ENCRYPTED DATA

(75) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 11/373,435

(22) Filed: Mar. 10, 2006

(65) Prior Publication Data

US 2006/0212715 A1  Sep. 21, 2006

(30) Foreign Application Priority Data

Mar. 18, 2005 (JP) ................... 2005-080236

(51) Int. Cl.
*H04K 1/00* (2006.01)
*H04L 9/00* (2006.01)

(52) U.S. Cl. ........ 713/184; 713/182; 713/183; 713/185; 713/155; 713/152; 380/51; 380/52; 380/53; 380/54; 380/55; 726/3; 726/5; 726/18; 726/27; 726/28

(58) Field of Classification Search .................. 713/152, 713/182–185, 155; 726/3–30; 380/51–55
See application file for complete search history.

(56) References Cited

U.S. PATENT DOCUMENTS

| | | | | |
|---|---|---|---|---|
| 5,673,373 A | * | 9/1997 | Nosaki et al. | 358/1.15 |
| 5,862,217 A | * | 1/1999 | Steinberg et al. | 713/176 |
| 6,307,640 B1 | * | 10/2001 | Motegi | 358/1.14 |
| 7,484,246 B2 | * | 1/2009 | Matsuyama et al. | 726/27 |
| 7,679,760 B2 | * | 3/2010 | Inoue et al. | 358/1.14 |
| 7,684,064 B2 | * | 3/2010 | Kimura et al. | 358/1.14 |
| 8,024,576 B2 | * | 9/2011 | Gargaro et al. | 713/183 |
| 2002/0040332 A1 | * | 4/2002 | Maari et al. | 705/27 |
| 2004/0145660 A1 | * | 7/2004 | Kusaka | 348/211.2 |
| 2004/0161277 A1 | * | 8/2004 | Gassho et al. | 400/76 |
| 2004/0264698 A1 | | 12/2004 | Oda | |
| 2005/0268089 A1 | * | 12/2005 | Kim et al. | 713/153 |
| 2006/0210244 A1 | * | 9/2006 | Fujita et al. | 386/94 |

FOREIGN PATENT DOCUMENTS

| | | |
|---|---|---|
| EP | 1492329 A2 | 12/2004 |
| EP | 1492329 A3 | 3/2006 |
| JP | 2000-118095 A | 4/2000 |
| JP | 2002-132728 A | 5/2002 |
| JP | 2003-209700 A | 7/2003 |
| JP | 2004-193657 A | 7/2004 |
| JP | 2004-328629 A | 11/2004 |
| JP | 2005-020346 A | 1/2005 |

OTHER PUBLICATIONS

AK Choudhury, NF Maxemchuk, S Paul, Copyright protection for electronic publishing over computer networks, IEEE network magazine, Jun. 1994.*

* cited by examiner

*Primary Examiner* — David Pearson
*Assistant Examiner* — Amir Mehrmanesh
(74) *Attorney, Agent, or Firm* — Canon USA, Inc., IP Division

(57) ABSTRACT

An image processing apparatus generates a password each time transmission of image data is instructed, encrypts the image data with the generated password, transmits the encrypted image data, and notifies the generated password.

8 Claims, 10 Drawing Sheets

[PASSWORD NOTIFICATION PRINT]

AUTOMATICALLY GENERATED PASSWORD IS :
HILAMHK9J4L340

TRANSMISSION ADDRESS : SHARED HOLDER 1

TRANSMITTED DOCUMENT NAME : MEETING MEMO 1

TRANSMITTER : A

TRANSMITTED DATE/TIME : 10/30/2004 17:00

TRANSMISSION FILE FORMAT : ENCRYPTED PDF

FIG.6

PASSWORD NOTIFICATION SCREEN

AUTOMATICALLY GENERATED PASSWORD IS :
HILAMHK9J4L340

[ CLOSE ]

| AUTHENTICATION SCREEN |
|---|
| PLEASE INSERT IC CARD |

FIG.15

| ERROR |
|---|
| AUTHENTICATION FAILED |

IMAGE PROCESSING APPARATUS AND METHOD FOR TRANSMITTING ENCRYPTED DATA

BACKGROUND OF THE INVENTION

1. Field of the Invention

The present invention relates to an image processing apparatus, a method and a program for transmitting encrypted data.

2. Description of the Related Art

There are conventional image processing apparatuses that can encrypt document data scanned from a document and transmit the encrypted document data to an arbitrary address (for example, refer to Japanese Patent Application Laid-open No. 2000-118095).

In many cases, a password is necessary to encrypt the document data. A user must input an arbitrary password each time he/she transmits document data. However, the number of characters constituting a password that a user can remember is limited. The number of passwords that a user can remember and manage is also limited. Thus, there is a tendency that the number of characters constituting a password is relatively small and the same password is often used to transmit data to different addresses. In other words, the security level is not high.

Furthermore, no method or device is available for a user to safely confirm a password used in the transmission of encrypted data. Accordingly, if a user forgets a password used in the transmission of encrypted data, the file is no longer decoded or decrypted.

SUMMARY OF THE INVENTION

The present invention is directed to an apparatus, a method and a program for facilitating transmission of encrypted data with a password differentiated for each address and increasing the security level.

Furthermore, the present invention is directed to an apparatus, method a program for displaying a password used in the transmission of encrypted data without lowering the security level.

A first aspect of the present invention provides an image processing apparatus including a password generating unit, a encrypting unit, a transmitting unit, and a notifying unit. The password generating unit generates a password if transmission of image data is instructed. The encrypting unit encrypts the image data with a password generated by the password generating unit. The transmitting unit transmits the image data encrypted by the encrypting unit. The notifying unit notifies the password generated by the password generating unit.

A second aspect of the present invention provides an image processing apparatus including a password generating unit, a encrypting unit, a transmitting unit, a history generating unit, an authenticating unit, and a notifying unit. The password generating unit generates a password if transmission of image data is instructed. The encrypting unit encrypts the image data with a password generated by the password generating unit. The transmitting unit transmits the image data encrypted by the encrypting unit. The history generating unit generates transmission history of encrypted image data. The authenticating unit executes authentication in response to a request for confirming the password based on the transmission history. The notifying unit notifies the password generated by the password generating unit if the authentication has succeeded.

A third aspect of the present invention provides a method for transmitting encrypted data, including a password generating step of generating a password if transmission of image data is instructed, a encrypting step of encrypting the image data with a password generated in the password generating step, a transmitting step of transmitting the image data encrypted in the encrypting step, and a notifying step of notifying the password generated in the password generating step.

A fourth aspect of the present invention provides a method for transmitting encrypted data, including a password generating step of generating a password if transmission of image data is instructed, a encrypting step of encrypting the image data with a password generated in the password generating step, a transmitting step of transmitting the image data encrypted in the encrypting step, a history generating step of generating transmission history of encrypted image data, an authenticating step of executing authentication in response to a request for confirming the password based on the transmission history, and a notify notifying step of notifying the generated password if the authentication has succeeded.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary embodiments, features and aspects of the present invention will now be herein described in detail below with reference to the drawings.

First Exemplary Embodiment

A first exemplary embodiment of the present invention will be described below. Initially, an overall arrangement of the first embodiment will be described.

Figure 1:
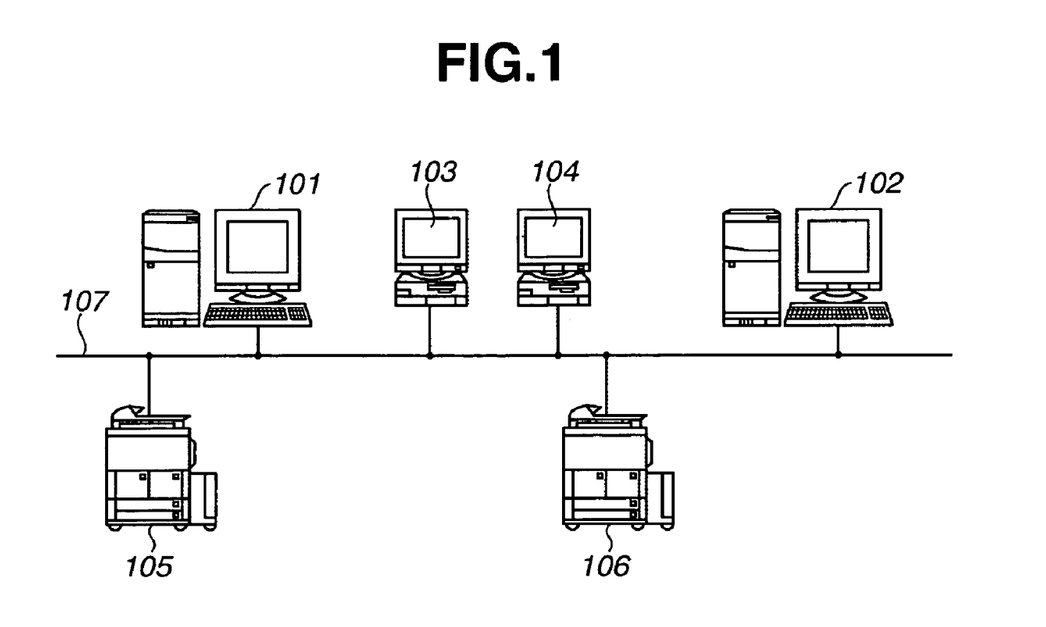
FIG. 1 is a diagram illustrating an exemplary image processing system in accordance with one embodiment of the present invention.

FIG. 1 is a diagram illustrating an image processing system in accordance with the first embodiment of the present invention. The image processing system includes an FTP (File Transfer Protocol) server 101 and a mail server 102 that are both connected to a network 107. Furthermore, the image processing system includes a first client personal computer (referred to as a "PC" in the following description) 103 and a second client PC 104 that are both connected to the network 107. Moreover, the image processing system includes a monochrome multi function peripheral (referred to as an "MFP" in the following description) 105 and a color MFP 106 that are both connected to the network 107.

The monochrome MFP 105 or the color MFP 106 scans a paper original (e.g., a document to be read) and produces electronic data. The image processing system can encrypt the electronic data and transmit the encrypted electronic data to an arbitrary address (such as FTP, E-Mail, or the like) via the network 107.

Figure 2:
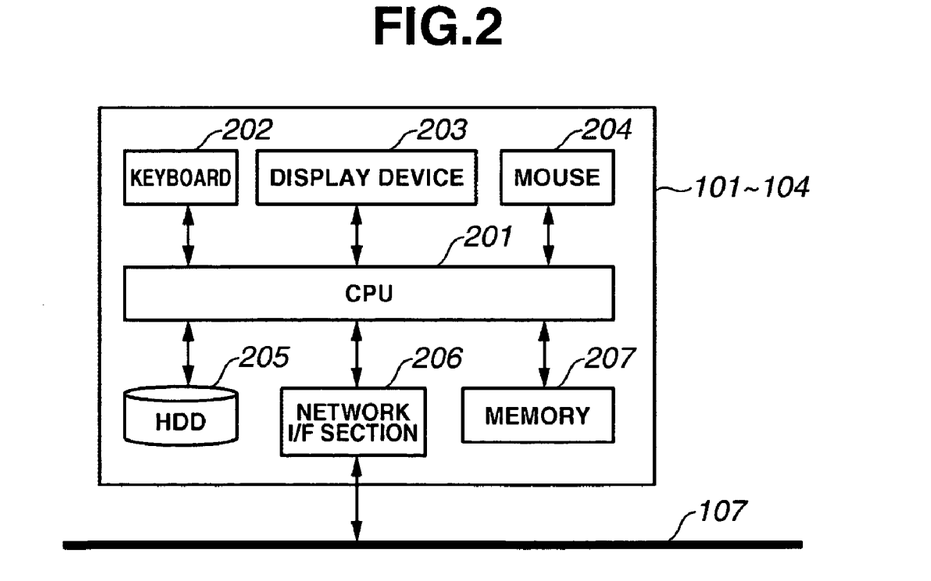
FIG. 2 is a block diagram showing an exemplary architecture of a server/client PC shown in FIG. 1.

FIG. 2 shows one example of a computer arrangement for the FTP server 101, mail server 102, first client PC 103, and second client PC 104 shown in FIG. 1. The computers 101 to 104 each include a CPU 201, a keyboard 202, a display device 203, a mouse 204, a hard disk drive 205, a network interface section 206, and a memory 207.

The CPU 201 executes arithmetic processing. The network interface section 206 controls communications through the network 107. A user can use the keyboard 202 and/or the mouse 204 to input data or commands. The hard disk drive 205 stores programs and data. The memory 207 temporarily stores the programs and data. The CPU 201 executes various controls based on computer programs stored in the memory 207 or in the hard disk drive 205.

Figure 3:
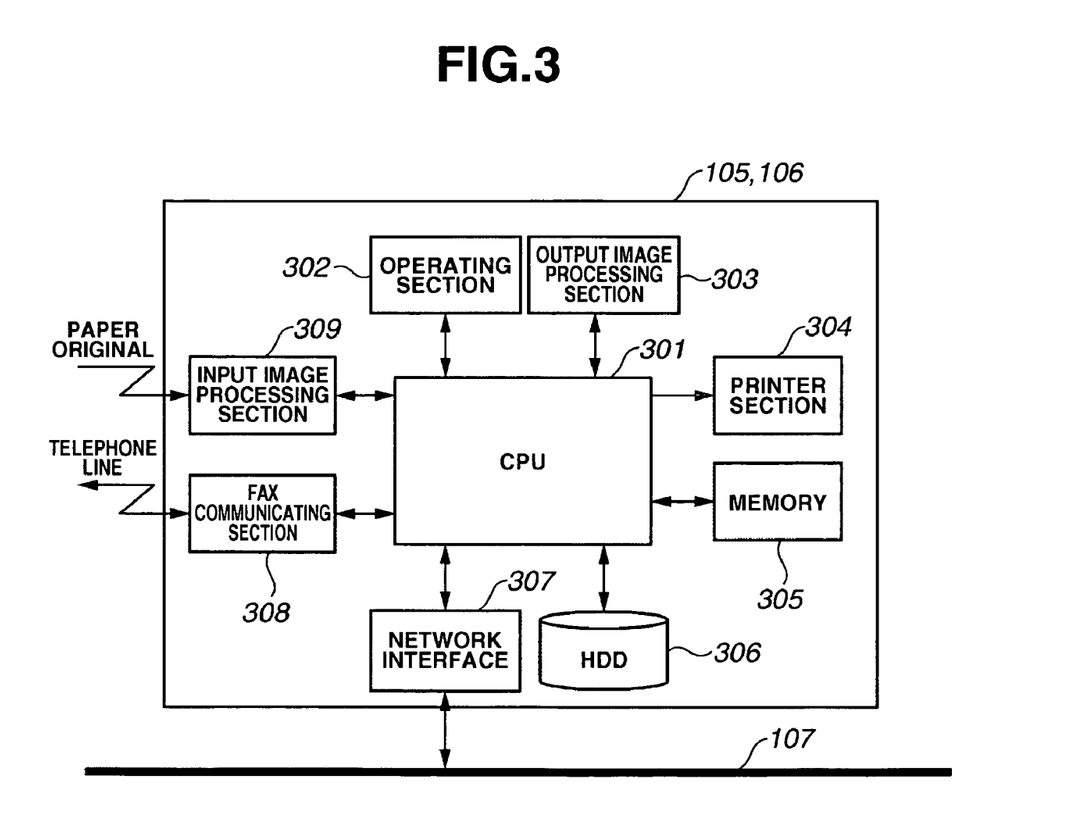
FIG. 3 is a block diagram showing an exemplary architecture of a multi function peripheral (MFP) shown in FIG. 1.

FIG. 3 shows an example of an exemplary architecture for the monochrome MFP 105 and the color MFP 106. The MFP (image processing apparatus) 105 or 106 includes a CPU 301, an operating section 302, an output image processing section 303, a printer section 304, a memory 305, a hard disk drive 306, a network interface 307, a FAX communicating section 308, and an input image processing section 309. The CPU 301 executes arithmetic processing.

A user can manipulate the operating section 302 to operate the multi function peripheral. The output image processing section 303 processes input image data. The hard disk drive 306 stores programs and data. The memory 305 temporarily stores the programs and data. The network interface 307 controls communications through the network 107. The printer section 304 prints image on a paper sheet. The FAX communicating section 308 controls FAX communications. The input image processing section 309 scans a paper original and produces readout image data. The CPU 301 executes computer programs stored in the memory 305 or in the hard disk drive 306.

Figure 16:
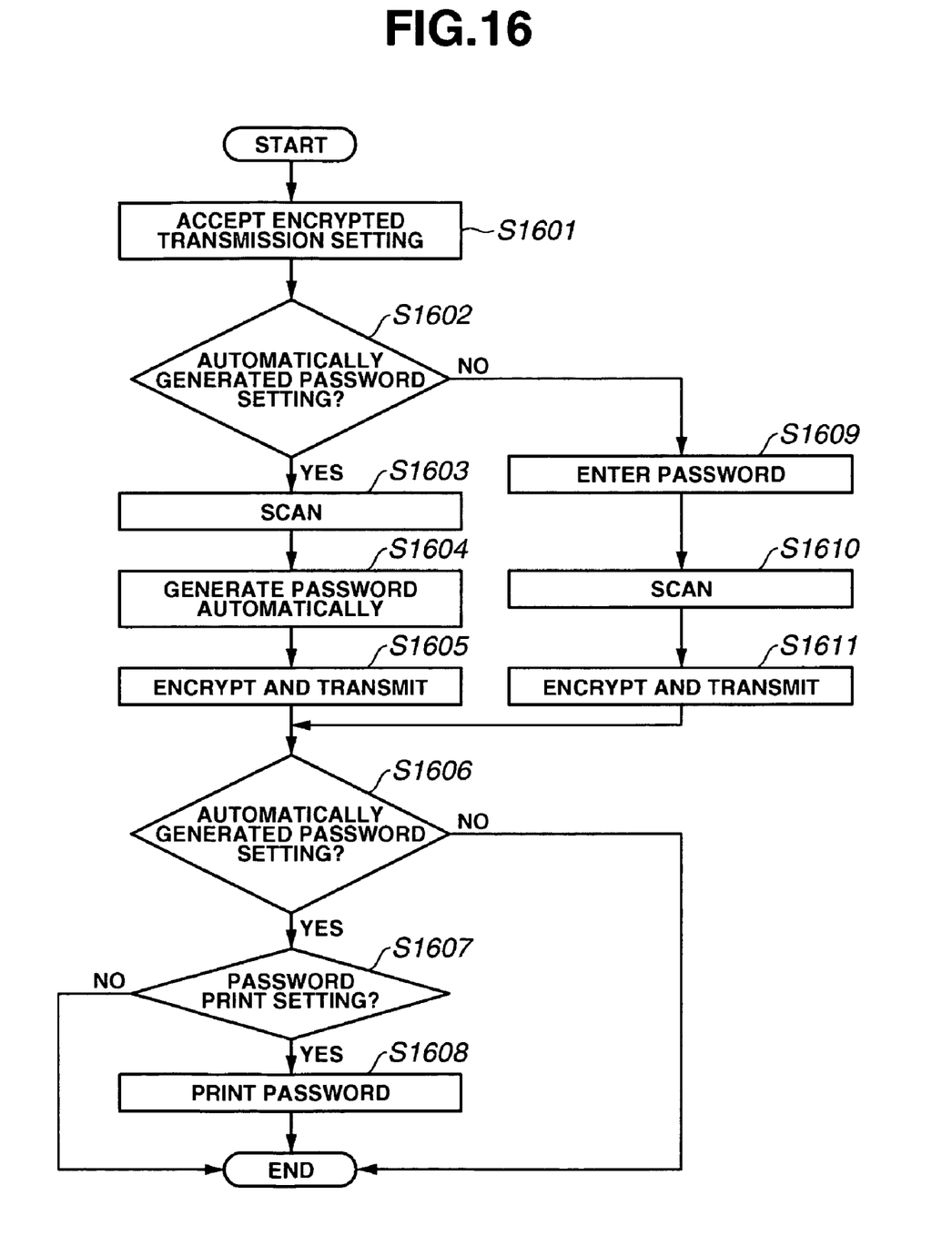
FIG. 16 is a flowchart showing an exemplary operation of the image processing system in accordance with the first embodiment.

FIG. 16 is a flowchart showing an exemplary operation of the image processing system according to the first embodiment. First in step S1601, the MFP 105 or 106 accepts an encrypted transmission setting entered by a user through the operating section 401 shown in FIG. 4. The encrypted transmission setting is required when the image data scanned from a paper original is encrypted and the encrypted image data is transmitted. The operating section 401 shown in FIG. 4 includes a check box 403 and a check box 404.

Figure 4:
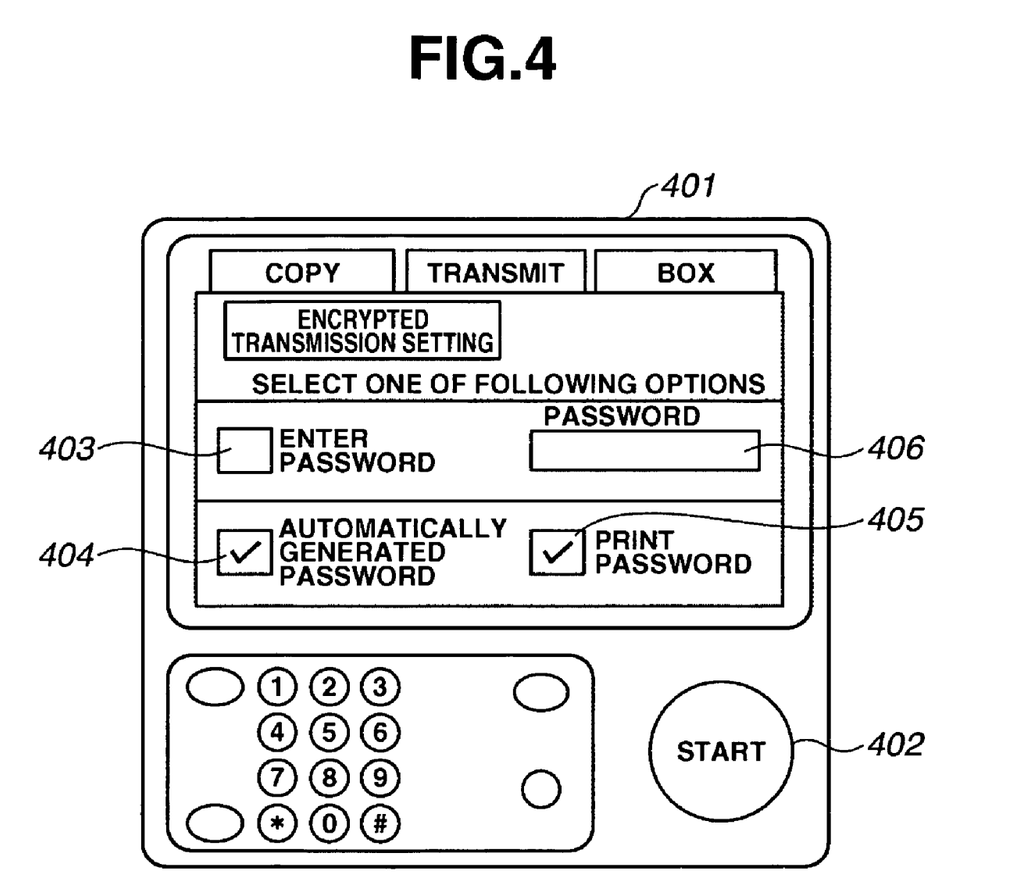
FIG. 4 is a view showing an exemplary setting screen used when encrypted data is transmitted.

The user inputs a check mark in the check box 403 when he/she enters a password to encrypt the data. On the other hand, the user inputs a check mark in the check box 404 when a password automatically generated by the MFP 105 or 106 is used to encrypt the data.

In step S1602, the MFP 105 or 106 determines whether or not the check box 404 is marked (i.e., whether or not the user prefers to use an automatically generated password). When a check mark is present in the check box 403 (i.e., NO in step S1602), the MFP 105 or 106 proceeds to step S1609, in which a user can input any password, which he/she likes to use, into an entry field 406 shown in FIG. 4.

After the user inputs an arbitrary password in the entry field 406 in step S1609, the user can depress a start button 402 shown in FIG. 4. Then, in step S1610, the MFP 105 or 106 starts scanning an original and produces image data. Next, in step S1611, the MFP 105 or 106 encrypts the produced image data with the password entered in step S1609 and transmits the encrypted image data to an arbitrary address. Then, the MFP 105 or 106 proceeds to step S1606.

On the other hand, when a check mark for the automatic password generation is present in the check box 404 (i.e., YES in step S1602), the MFP 105 or 106 proceeds to step S1603. In this case, if printing of password is desirable, a user can input a check mark in a check box 405 shown in FIG. 4. After the user inputs a check mark in the check box 404, the user can depress the start button 402. Then, in step S1603, the MFP 105 or 106 starts scanning an original and produces image data. Next, in step S1604, the MFP 105 or 106 automatically generates a password.

Next, in step S1605, the MFP 105 or 106 encrypts the produced image data with the password automatically generated in step S1604 and transmits the encrypted image data to an arbitrary address. Then, the MFP 105 or 106 proceeds to step S1606. In step S1606, after accomplishing the transmission of encrypted data, the MFP 105 or 106 determines whether or not a check mark for the automatic password generation is present in the check button 404.

When a check mark is present in the check button 404 (i.e., YES in step S1606), the MFP 105 or 106 proceeds to step S1607. When no check mark is present in the check button 404 (i.e., NO in step S1606), the MFP 105 or 106 terminates the processing.

In step S1607, the MFP 105 or 106 determines whether or not a check mark for the printing of password is present in the check box 405. When a check mark is present in the check box 405 (i.e., YES in step S1607), the MFP 105 or 106 proceeds to step S1608. When no check mark is present in the check box 405 (i.e., NO in step S1607), the MFP 105 or 106 terminates the processing. In step S1608, the MFP 105 or 106 causes the printer section 304 to print the automatically generated password after accomplishing the transmission of encrypted data.

Figure 5:
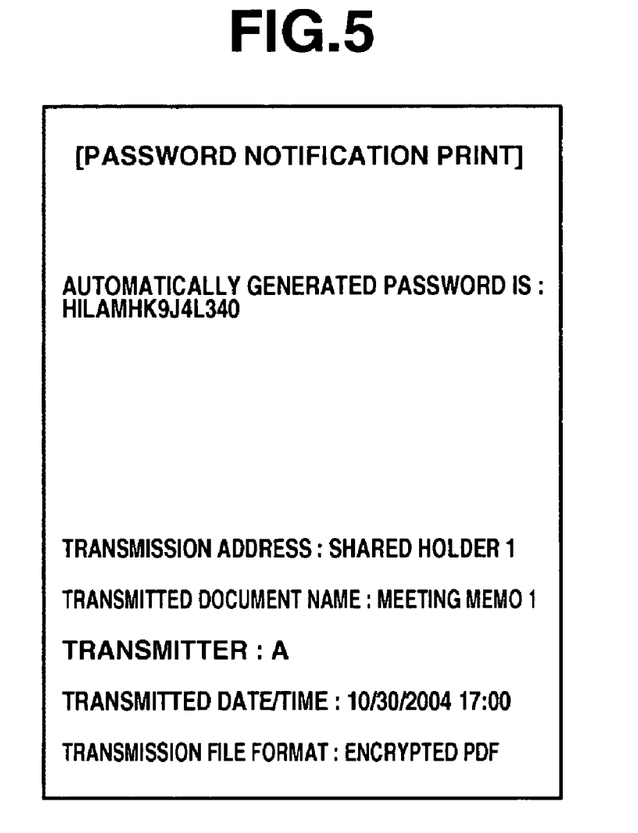
FIG. 5 is a view showing an example of a password notification print.

FIG. 5 shows an example of printed contents, which includes a password automatically generated by the MFP 105 or 106, an address, a transmitted document name, a transmitter, a date/time of transmission, and a file format of transmitted data. However, the present embodiment does not limit the printed contents to the disclosed ones and, therefore, can include other transmission information.

When no check mark is present in the check button 404 (i.e., when the automatic password generation is not requested), the MFP 105 or 106 prints nothing about the password and terminates the processing after accomplishing the transmission of encrypted data. When no check mark is present in the check button 405 (i.e., when the printing of password is not requested), the MFP 105 or 106 prints nothing about the password and terminates the processing after accomplishing the transmission of encrypted data.

Figure 6:
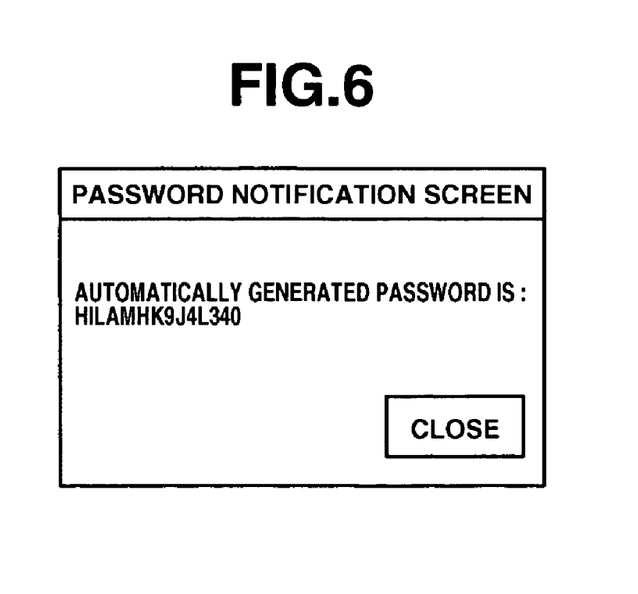
FIG. 6 is a view showing an example of a password display screen.

In the present embodiment, a method for letting a user confirm a password automatically generated by the MFP 105 or 106 is not limited to the printing of password. For example, it is desirable to display the password on a display device of the MFP 105 or 106. To display a password, the MFP 105 or 106 can use a screen shown in FIG. 6 that is displayed on the display device so that a user can visually confirm the automatically generated password.

As described above, the MFP 105 or 106 can automatically generate a password required when encrypted data is transmitted, and can release a user from a troublesome operation for inputting a password every time he/she transmits the data. Furthermore, the MFP 105 or 106 having the capability of automatically generating a password for each transmission of encrypted data can reduce the probability of using the same password when a user transmits the data to a plurality of addresses and thus can facilitate increasing the security level. Moreover, the automatically generated password can be printed or displayed so that a user can confirm a password generated by the MFP 105 or 106.

Second Exemplary Embodiment

A second exemplary embodiment of the present invention will be described below. Details similar to the first embodiment will not be repeated here.

Figure 17:
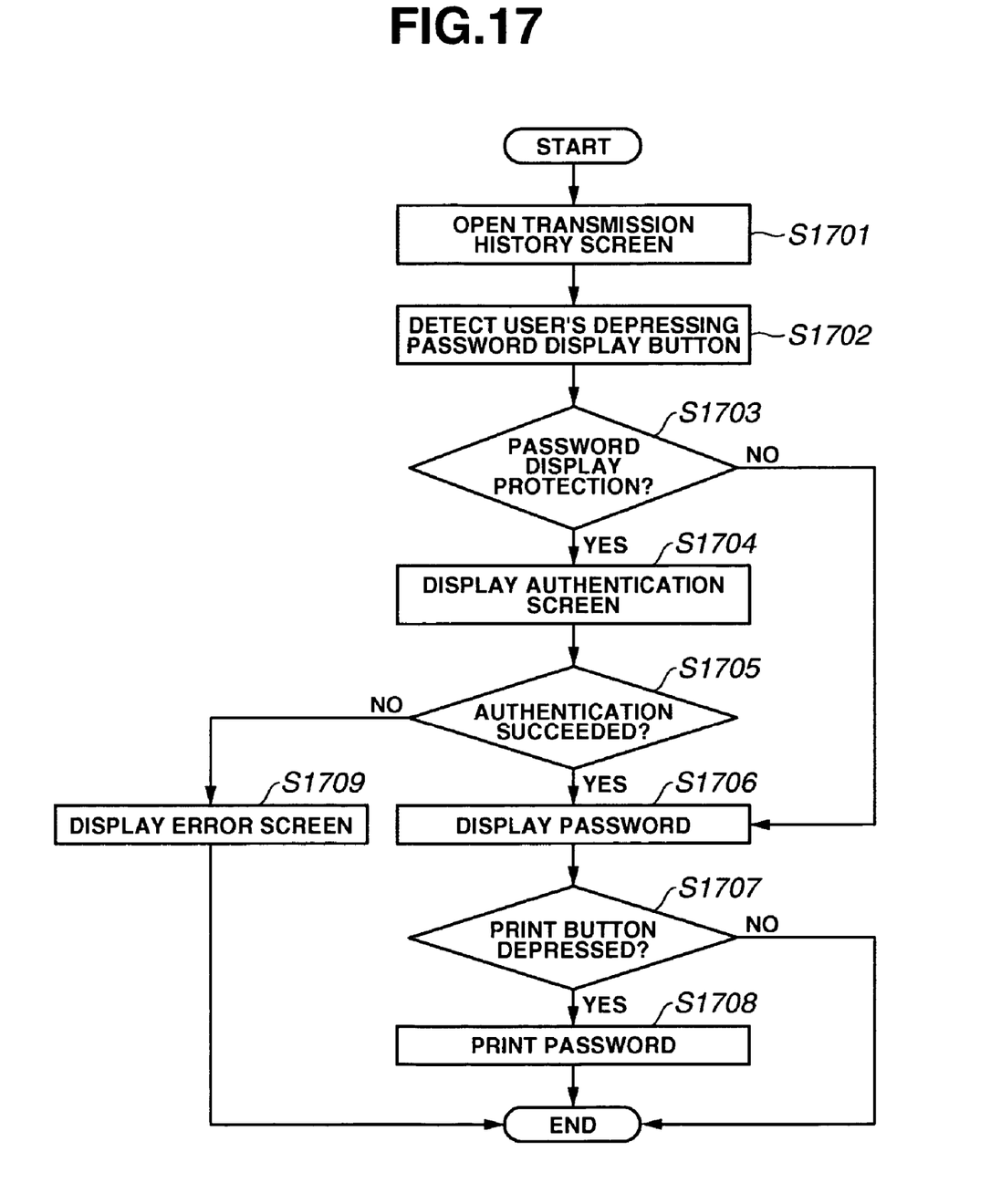
FIG. 17 is a flowchart showing an exemplary operation of the image processing system in accordance with a second embodiment.

FIG. 17 is a flowchart showing an exemplary operation of the image processing system according to the second embodiment. First in step S1701, the MFP 105 or 106 displays a transmission history screen (refer to FIG. 10) in response to a user's instruction entered through the operating section 401. The transmission history screen indicates the result of transmission of encrypted data. The transmission history is generated after the MFP 105 or 106 has accomplished the transmission of encrypted data.

To display the transmission history screen (FIG. 10), a user can depress a password display button 1001. In step S1702, the MFP 105 or 106 detects an operation of the user who has depressed the password display button 1001 to confirm a password. Next, in step S1703, the MFP 105 or 106 determines whether or not a password display protection is effected. When the password display protection is effected (i.e., YES in step S1703), the MFP 105 or 106 proceeds to step S1704. Otherwise, i.e., when the password display protection is not effected (i.e., NO in step S1703), the MFP 105 or 106 proceeds to step S1706.

Figure 10:
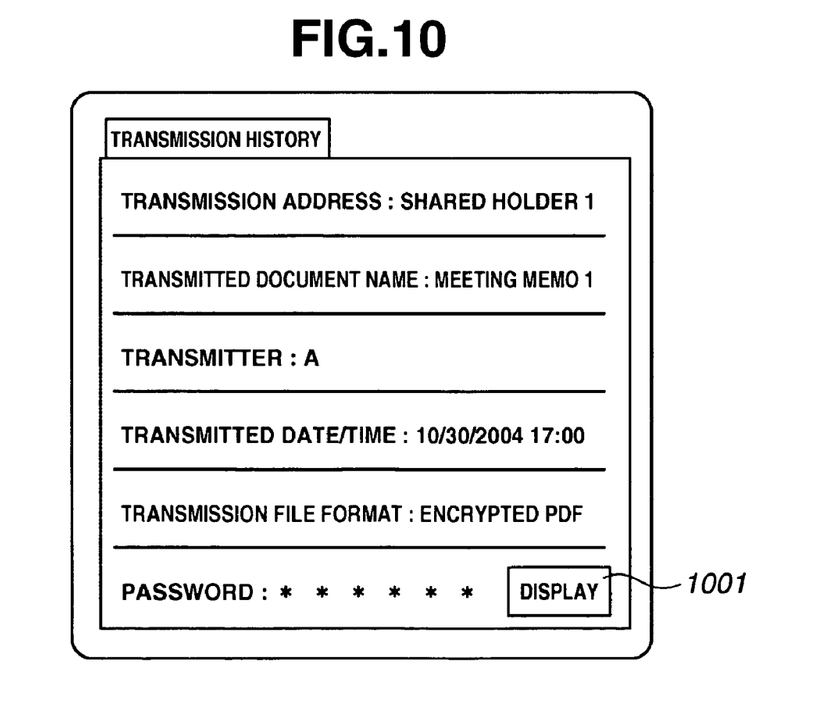
FIG. 10 is a view showing an exemplary transmission history screen that displays a password.
Figure 11:
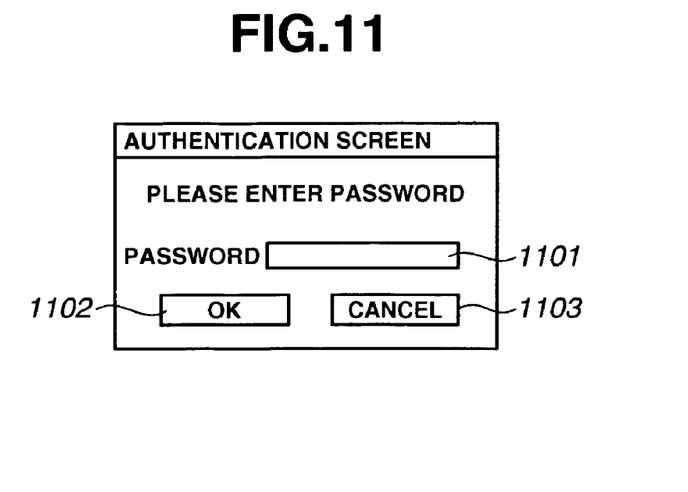
FIG. 11 is a view showing an exemplary first authentication screen.

In step S1704, the MFP 105 or 106 displays an authentication screen shown in FIG. 11. The exemplary authentication screen includes box to enter a password 1101, an "OK" button 1102, and a cancel button 1103. The setting for the password display protection is made in response to user's depressing the password display button 1001 to display the transmission history screen (FIG. 10).

A setting method for the password display protection will be described below with reference to FIGS. 7, 8, and 9. The setting for the password display protection begins with a password display protection setting screen (FIGS. 7 and 8) displayed in association with a system management setting screen of the MFP 105 or 106.

Figure 7:
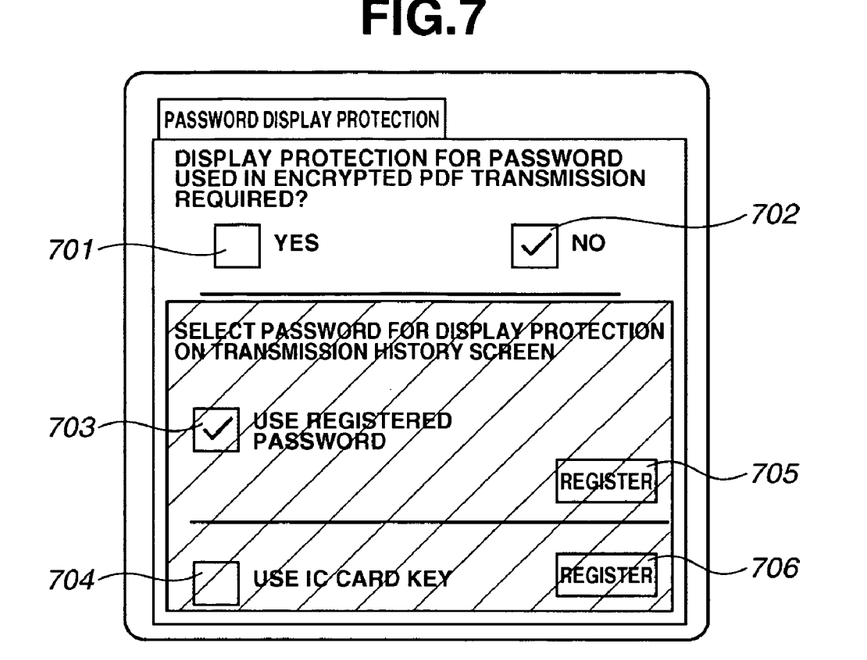
FIG. 7 is a view showing an exemplary first password display protection setting screen.

FIG. 7 shows a displayed condition of the setting screen, according to which a check mark is present in a check box 702 that cancels the password display protection. When a user inputs a check mark in the check box 702, no password display protection is effected.

Figure 8:
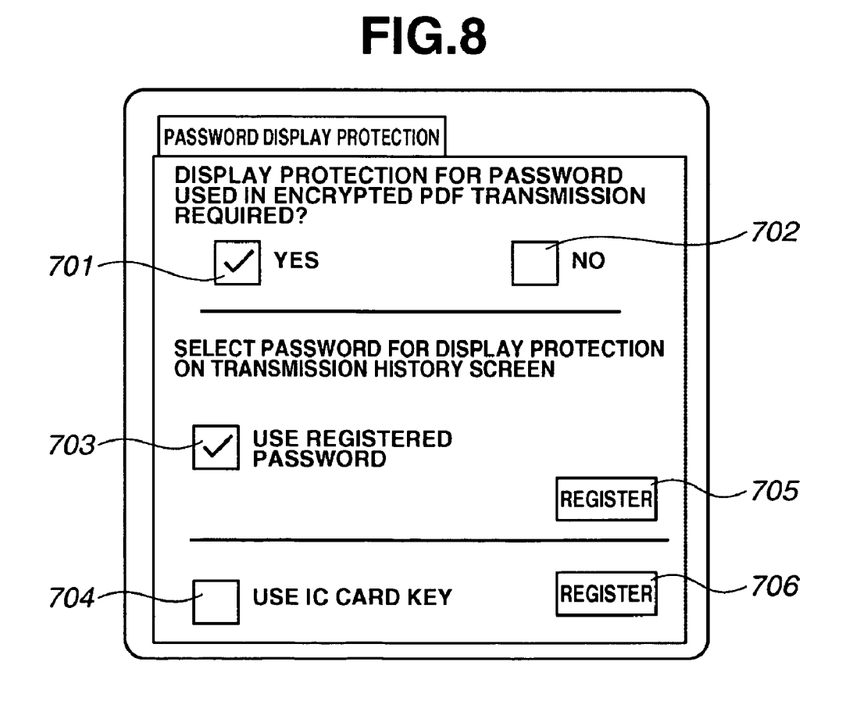
FIG. 8 is a view showing an exemplary second password display protection setting screen.

FIG. 8 shows a displayed condition of the setting screen, according to which a check mark is present in a check box 701 that effects the password display protection. When a user inputs a check mark in the check box 701, the password display protection is effected.

In the displayed condition of FIG. 7, a gray zone including buttons 703, 704, 705, and 706 nullifies any user's instructions. On the other hand, the displayed condition of FIG. 8 allows a user to select any one of the buttons 703, 704, 705, and 706.

Once a user requests the password display protection, the user can select a method for canceling the password display protection. As a method for canceling the password display protection, a user can select either using a password registered by the user or using a key stored in an IC card.

When a user prefers a registered password, the user inputs a check mark in the check box 703 and then depresses a register button 705 to register an arbitrary password in the MFP 105 or 106.

Figure 9:
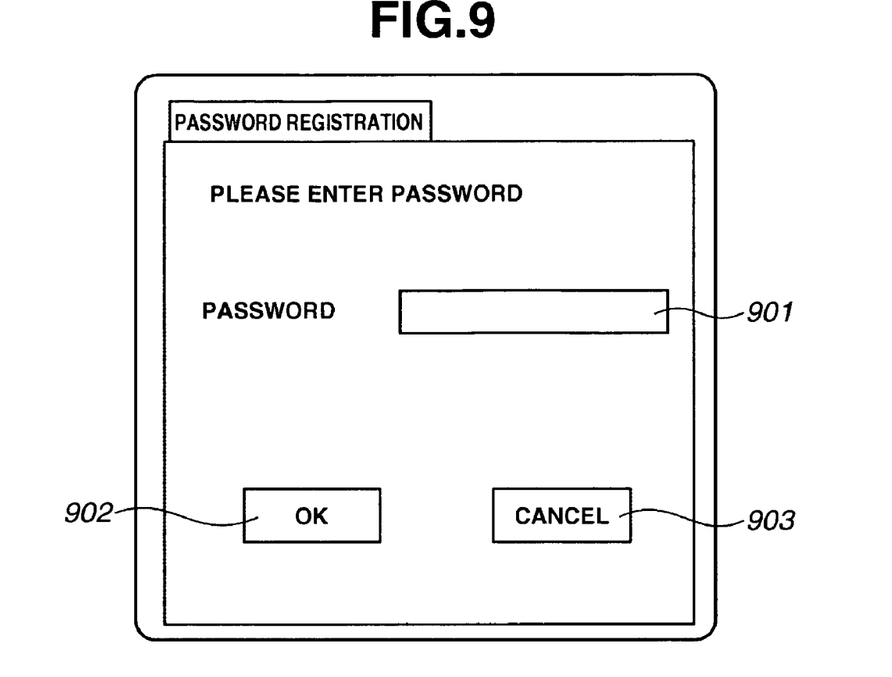
FIG. 9 is a view showing an exemplary password registration screen.

FIG. 9 is a password registration screen displayed when the register button 705 is depressed. A user can register an arbitrary password on the screen. More specifically, the user can input a string of characters, numerals, or a combination of them constituting a password into a password entry field 901 and then depress an OK button 902 to register the entered password, or can depress a cancel button 903 to cancel registering the entered password.

When a user selects an IC card to cancel the password display protection, the user inputs a check mark in the check box 704. The user inserts the IC card into the MFP 105 or 106 and depresses the register button 706. The MFP 105 or 106 obtains a key from the IC card and registers the key.

Now referring back to FIG. 17, after the password display button 1001 is depressed by the user, the MFP 105 or 106 determines in step S1703 whether or not there is the setting for the password display protection. When the setting for the password display protection is present (i.e., YES in step S1703), the MFP 105 or 106 proceeds to step S1704 to display an authentication screen (refer to FIG. 11 or FIG. 14). Then, in step S1705, the MFP 105 or 106 determines whether or not the authentication has succeeded.

When the authentication has succeeded (i.e., YES in step S1705), the MFP 105 or 106 proceeds to step S1706. Otherwise, i.e., when the authentication has failed (i.e., NO in step S1705), the MFP 105 or 106 proceeds to step S1709. In step S1706, the MFP 105 or 106 displays a password display screen shown in FIG. 13. In step S1709, the MFP 105 or 106 displays an error screen without displaying any password. Then, the MFP 105 or 106 terminates the processing.

The authentication screen displayed in step S1704 is dependent on the preference of a user who inputs a check mark in the check box 703 or 704 shown in FIG. 8. When a check mark is present in the check box 703, the MFP 105 or 106 displays the authentication screen shown in FIG. 11 and requests a user to input a password.

Then, the MFP 105 or 106 compares the password entered on the authentication screen of FIG. 11 with the password entered on the registration screen of FIG. 9. When the compared passwords are identical with each other, the MFP 105 or 106 confirms success in the authentication. When a check mark is present in the check box 704, the MFP 105 or 106 displays an authentication screen shown in FIG. 14 and requests a user to insert an IC card.

Figure 14:
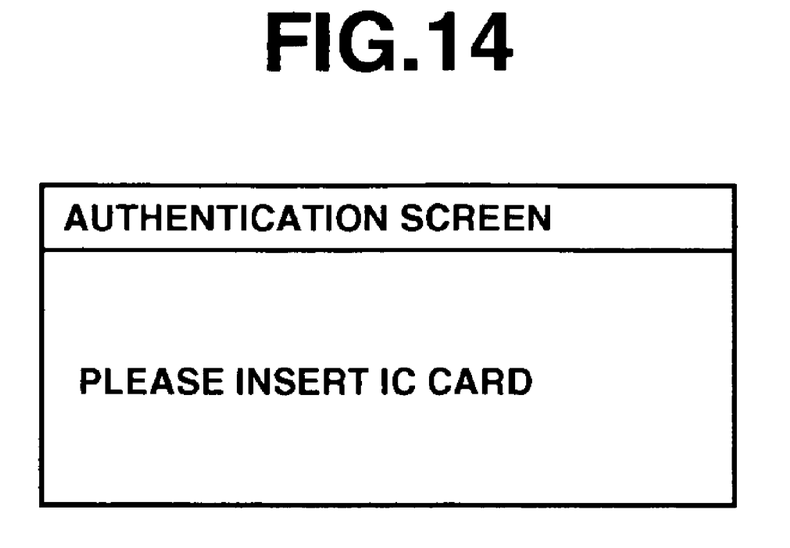
FIG. 14 is a view showing an exemplary second authentication screen.

More specifically, the user inserts his/her IC card in accordance with guidance on the authentication screen of FIG. 14. The MFP 105 or 106 obtains a key from the IC card and compares the obtained key with the registered key that is entered upon user depressing the register button 706 of FIG. 8. When the compared keys are identical with each other, the MFP 105 or 106 confirms success in the authentication.

Figure 12:
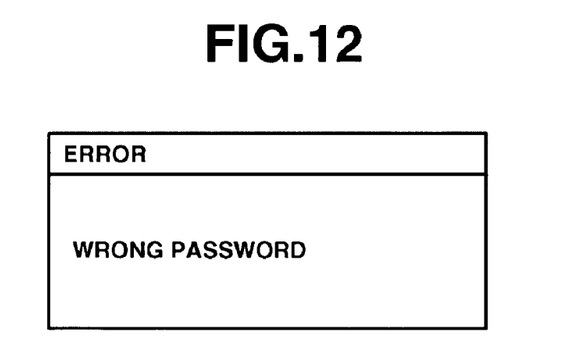
FIG. 12 is a view showing an exemplary first error dialog box.
Figure 15:
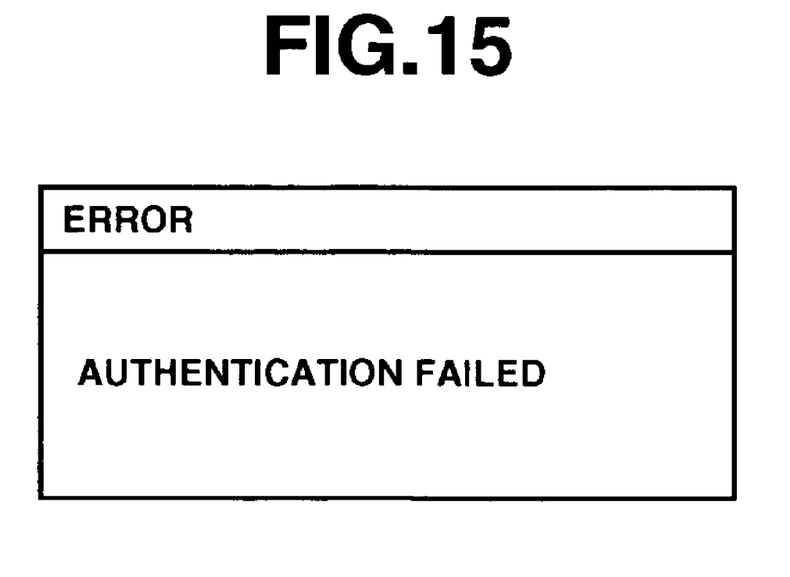
FIG. 15 is a view showing an exemplary second error dialog box.

When the authentication has failed and a check mark is present in the check box 703, the MFP 105 or 106 displays the error screen of FIG. 12 in step S1709. When the authentication has failed and a check mark is present in the check box 704, the MFP 105 or 106 displays the error screen of FIG. 15 in step S1709. The MFP 105 or 106, in step S1706, displays the screen of FIG. 13 which shows a password that a user can read.

The IC card is not limited to a particular type and can be replaced with another external portable memory device. When such an external portable memory device is operatively connected to the MFP 105 or 106, the MFP 105 or 106 can execute authentication based on key information obtained from the external portable memory device.

Figure 13:
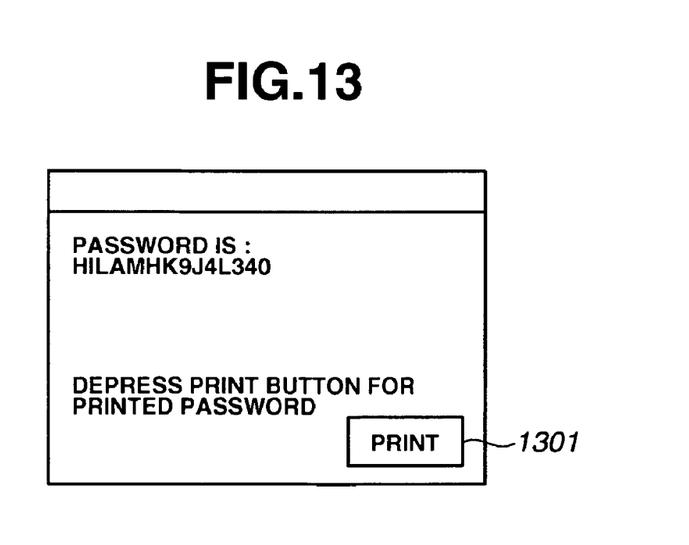
FIG. 13 is a view showing an exemplary password display screen.

Furthermore, when a check mark is present in the check box 702 and the password display button 1001 of FIG. 10 is depressed, the MFP 105 or 106 displays the screen of FIG. 13 in step S1706 without displaying any authentication screen. Then, in step S1707, the MFP 105 or 106 determines whether or not a print button 1301 shown in FIG. 13 is depressed by a user. When the print button 1301 is depressed (i.e., YES in step S1707), the MFP 105 or 106 proceeds to step S1708 to print a password notification on a paper sheet as shown in FIG. 5. When the print button 1301 is not depressed (i.e., NO in step S1707), the MFP 105 or 106 terminates the processing without printing the password.

The above-described password display and/or printing method can allow a user to visually confirm an automatically generated password. As described above, the second embodiment can provide the transmission history screen that shows a password used when encrypted data is transmitted. Thus, when a user forgets the password having been used in the transmission, the user can later confirm the password by referring to the transmission history screen.

The MFP 105 or 106 can transmit encrypted image data to the computers 101 to 104. The computers 101 to 104 can decrypt the received encrypted image data with the password identical with that used in the transmission of the encrypted data. Furthermore, display of password can be cancelled when authentication has failed. This facilitates increasing the security level in the display of a password on the transmission history screen.

The MFP 105 or 106 automatically generates a password for each job instructing transmission of image data. The automatically generated password is differentiated every time encrypted data is transmitted. Hence, the second embodiment can automatically change a password when encrypted data is transmitted to a different address, thereby increasing the security level.

Furthermore, the MFP 105 or 106 having the capability of automatically generating a password for each transmission of encrypted data can release a user from a troublesome operation for inputting a password every time he/she transmits the data. Moreover, the automatically generated password can be printed out by the MFP 105 or 106 or displayed on a display screen of the MFP 105 or 106, after the transmission of encrypted data is accomplished.

In addition, the transmission history screen permits a user alone to confirm the password having been used in the transmission of encrypted data. Therefore, in an event that a user forgets the password having been used in the transmission of encrypted data, the user can later confirm the password by referring to the transmission history screen. Thus, the password used in the transmission of encrypted data can be displayed without lowering the security level.

Other Exemplary Embodiments, Features and Aspects of the Present Invention

The above-described embodiments can be realized by a computer that executes program(s). Furthermore, the preset invention encompasses a CD-ROM or other recording medium that can store computer program(s) or the Internet or other transmission medium that can transmit the program(s). Furthermore, the preset invention encompasses other recording devices and computer related products that can store the computer program(s). The recording medium can be any one of a flexible disk, a hard disk, an optical disk, a magneto-optical disk, a CD-ROM, a CD-R, a CD-RW, a magnetic tape, a nonvolatile memory card, a ROM, a DVD (DVD-ROM, DVD-R) or the like.

As a password can be automatically generated every time encrypted data is transmitted, a user is no longer required to make a troublesome operation for inputting a password every time he/she transmits the data. Furthermore, the password is automatically changed when encrypted data is transmitted to a different address. Thus, the security level can be increased.

Moreover, a user can confirm the password ever used in the transmission based on the transmission history. In other words, a user needs not to remember the password having been used in the transmission of encrypted data, because the user can later confirm the password by referring to the transmission history.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-080236 filed Mar. 18, 2005, which is hereby incorporated by reference herein in its entirety.

What is claimed is:

1. An image processing apparatus, comprising:
an encrypting unit configured to encrypt image data with a password;
a transmitting unit configured to transmit image data encrypted by the encrypting unit to a transmission destination;
a history storage unit configured to store the password and transmission history of encrypted image data, wherein the transmission history corresponds to the password;
a receiving unit configured to receive, from a user, a request for confirming the password;
an authenticating unit configured to execute, in response to the receiving unit receiving the request, authentication of the user;

a display unit configured to display the password based on the transmission history in response to authentication of the user succeeding, wherein the user uses the displayed password at the transmission destination to decrypt the image data encrypted by the encrypting unit and transmitted by the transmitting unit, and wherein at least the encrypting unit, the receiving unit, and the authenticating unit are implemented by a central processing unit in the image processing apparatus.

2. The image processing apparatus according to claim 1, further comprising:

an image inputting unit configured to read an original and produce image data, wherein the encrypting unit encrypts the image data produced by the image inputting unit.

3. The image processing apparatus according to claim 1, further comprising:

a password inputting unit configured to input an authentication password, wherein the authenticating unit confirms success in the authentication of the user in response to the authentication password entered from the password inputting unit being identical with a registered password.

4. The image processing apparatus according to claim 1, further comprising:

an acquiring unit configured to obtain authentication key information from an external portable memory device, wherein the authenticating unit confirms success in the authentication of the user in response to the authentication key information obtained by the acquiring unit being identical with registered key information, and wherein the acquiring unit is implemented by a central processing unit in the image processing apparatus.

5. An image processing apparatus according to claim 1, further comprising:

a password generating unit configured to generate a password in accordance with an instruction of transmission of image data, wherein the encrypting unit encrypts the image data with the password generated by the password generating unit.

6. An image processing apparatus according to claim 1, wherein the password generating unit generates a different password for each transmission of the image data.

7. A method for transmitting encrypted data, the method comprising:

encrypting image data with a password;

transmitting encrypted image data to a transmission destination;

storing the password and transmission history of encrypted image data, wherein the transmission history corresponds to the password;

receiving, from a user, a request for confirming the password;

executing, in response to receiving the request, authentication of the user; and displaying the password based on the transmission history in response to authentication of the user succeeding, wherein the user uses the displayed password at the transmission destination to decrypt the encrypted and transmitted image data.

8. A non-transitory computer readable medium storing a program causing an image processing apparatus to perform the method according to claim 7.

* * * * *